United States Patent [19]

Mitchell

[11] Patent Number: 5,018,756
[45] Date of Patent: May 28, 1991

[54] CONTROL FOR SELF STEERING SUSPENSION ASSEMBLY

[75] Inventor: James L. Mitchell, Springfield, Mo.

[73] Assignee: Ridewell Corporation, Springfield, Mo.

[21] Appl. No.: 424,908

[22] Filed: Oct. 23, 1989

[51] Int. Cl.⁵ .............................................. B62D 61/12
[52] U.S. Cl. .................................. 280/81.6; 280/661; 280/704
[58] Field of Search ............... 280/704, 661, 675, 676, 280/81.6, 714, 711

[56] References Cited

U.S. PATENT DOCUMENTS

| | | | |
|---|---|---|---|
| 3,704,896 | 12/1972 | Buelow | 280/704 |
| 4,763,923 | 8/1988 | Raidel | 280/704 |
| 4,770,430 | 9/1988 | Lange | 280/81.6 |
| 4,881,747 | 11/1989 | Raidel | 280/81.6 |

*Primary Examiner*—Kenneth R. Rice
*Attorney, Agent, or Firm*—Rogers, Howell & Haferkamp

[57] ABSTRACT

A suspension system incorporating upper and lower torque rods pivotally connected between a hanger and an axle seat. The upper torque rod is preferably a hydraulic cylinder and piston assembly, the length of which is adjustable between extended and retracted conditions. In the extended condition, the upper torque rod pivots the axle to a forward pitch at which it is self-steering when the vehicle is driven forward. In the retracted condition, the upper torque rod pivots the axle to a negative pitch condition in which it is self-steering when the vehicle is operated in reverse. The hydraulic cylinder and piston assembly can be operated by the driver such as when the gears are shifted between forward and reverse. A lift spring is mounted between a plate on the hanger and a plate on the lower torque rod. The lift spring is positioned within a pocket defined on the hanger. The hanger is integral with a longitudinal plate and an upper spring mounting plate, and a shock absorber bracket is integral with the longitudinal plate.

19 Claims, 4 Drawing Sheets

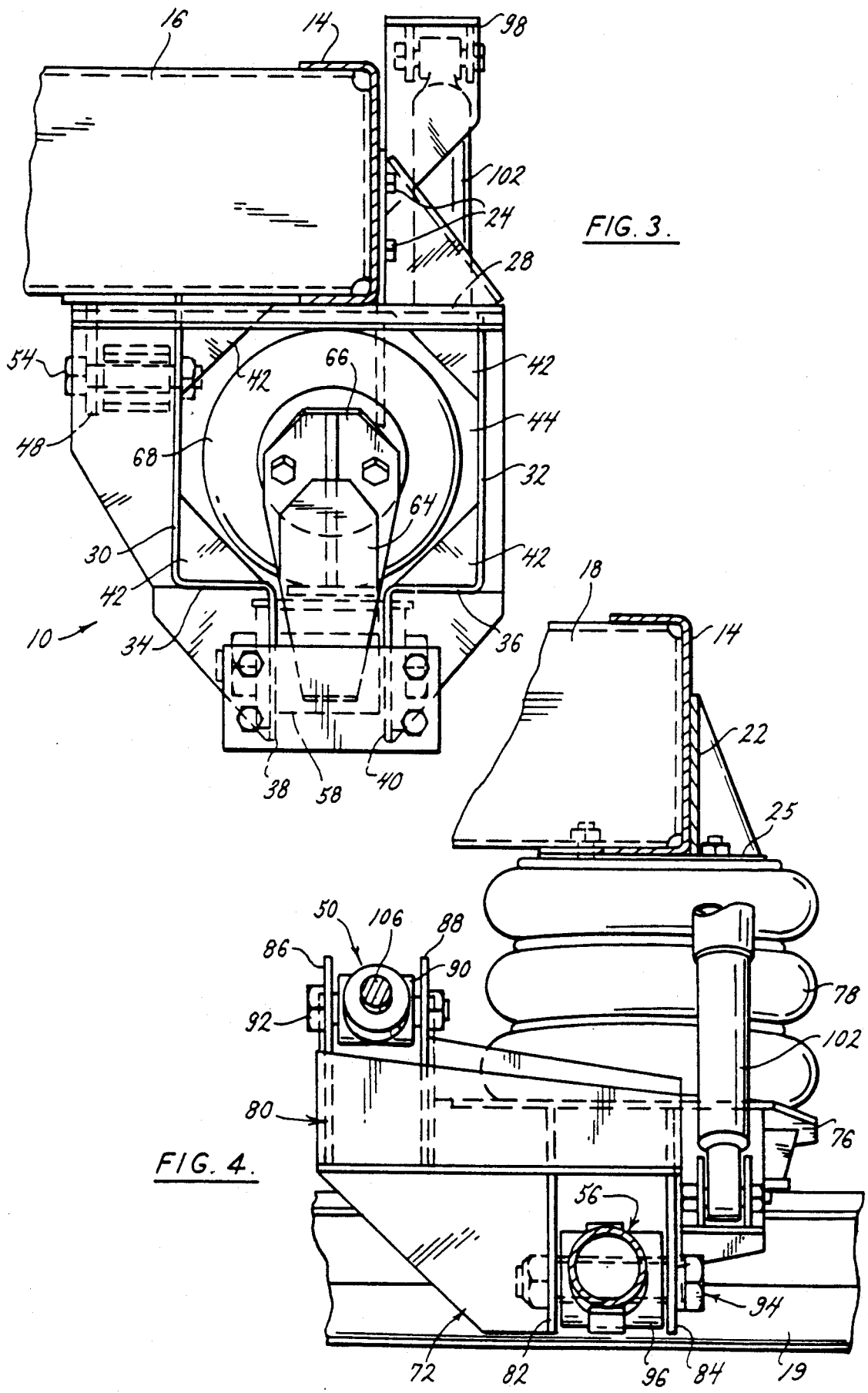

CONTROL FOR SELF STEERING SUSPENSION ASSEMBLY

BACKGROUND OF THE INVENTION

This invention relates to a suspension system that incorporates an automatic driver-controllable fluid system for setting the pitch of the axle. Pursuant to the invention, the pitch of the axle can be selectively set for self steering in either a forward or reverse direction. The control prevents loss of forward pitch in the event of a failure in the fluid supply lines.

DESCRIPTION OF THE RELATED ART

In suspension systems for trailing axles and pusher axles, it is known that if the axle is installed with the proper pitch or caster, the drag of the wheels will cause the axle to steer automatically in response to steering of the vehicle. It is also known in the art to provide a parallelogram arrangement of torque rods connected between a hanger and an axle seat to maintain a substantially constant pitch of the axle.

U.S. Pat. No. 4,132,432 to Raidel discloses an example of a suspension system wherein torque rods are connected between a hanger and an axle seat and are arranged in a parallelogram for maintaining a constant pitch of the axle. A lift spring is mounted between a plate on the hanger and a plate is connected to the lower torque rod. In the suspension system of this patent, as is typical, the axle pitch is constant and cannot be adjusted.

U.S. Pat. No. 4,132,432 also discloses an integral hanger and spring mount connected to an elongated longitudinal plate. The present suspension system is extremely compact and the hanger incorporates a cavity to accommodate the lift spring.

U.S. Pat. No. 4,770,430 to Lange discloses a self-steering axle assembly where the pitch of a vehicle axle is controlled by a four-way valve that either supplies fluid pressure to, or discharges fluid pressure from, a piston/cylinder assembly. Should the supply of fluid pressure be interrupted, the pitch of the axle can not be controlled.

BRIEF SUMMARY OF THE INVENTION

This suspension system incorporates two torque rods on each side of the vehicle pivotally connected between a hanger and an axle seat with the hanger depending from the vehicle chassis and the axle seat being connected to the axle. One of the torque rods, preferably the upper one, consists of a fluid cylinder and piston, preferably hydraulic. There are separate forward and reverse fluid ports to the cylinder, and the piston is extendable or retractable relative to the cylinder depending upon the direction of flow of hydraulic fluid through the ports.

In the extended condition, the hydraulic cylinder and piston have an overall length equal to the length of the lower torque rod. In the retracted condition, the hydraulic cylinder and piston is shortened. Alternative extension or retraction of the hydraulic cylinder and piston causes the axle seat to swing about its pivotal connection to the lower torque rod and this swings the axle, changing its pitch from a forward pitch of 4 to 6 degrees relative to a vertical plane to a rearward pitch of 4 to 6 degrees relative to the vertical plane.

The forward pitch of the axle is set to be optimum for self steering of the axle when the vehicle is moving in a forward direction. This constitutes approximately a 5° angle and is established by the extended condition of the cylinder and piston assembly. In this condition, the upper and lower torque rods are of equal length and their connections represent a parallelogram thereby maintaining constant the forward pitch of the axle.

When the vehicle transmission is operated in a reverse drive ratio, the axle seat is controlled to swing around its connection with the lower torque rod to a rearward pitch of about 5½°. In this condition, the piston of the upper torque rod is retracted to a predetermined position setting a predetermined shortened length of the piston and cylinder assembly. The reversed pitch is optimum for self steering of the axle when the vehicle is operated in a reverse direction.

A control system controls whether fluid pressure is supplied to the forward fluid port of the cylinder and discharged from the reverse port to extend the piston and adjust the caster of the axle to the forward pitch, or whether fluid pressure is supplied to the reverse fluid port of the cylinder and discharged from the forward port to retract the piston and adjust the caster of the axle to a reverse pitch. The control system comprises a solenoid operated valve that supplies fluid pressure selectively to either the forward or reverse port of the cylinder, while discharging fluid from the other port. The solenoid can be connected directly to the electrical circuit of the vehicle back-up lights so that the solenoid is energized, along with the back-up lights, when the vehicle transmission is shifted into reverse. When the transmission is shifted into reverse, the energized solenoid valve supplies fluid pressure to the reverse port of the cylinder and discharges fluid from the forward port. When the transmission is shifted to a forward drive ratio, the de-energized solenoid valve is spring-biased to return to an at-rest position where it supplies fluid pressure to the forward port of the cylinder and discharges fluid from the reverse port.

The control system also comprises a control valve that prevents fluid from escaping through the forward port of the cylinder, with consequent loss of pressure, unless fluid pressure is being supplied to the reverse fluid port by the solenoid valve. This important feature of the invention prevents loss of pressure and holds the correct axle pitch when the vehicle is travelling forward, even in the event of a break in the fluid line leading from the forward port.

The hanger assembly comprises an integral unit including a longitudinally extending plate to which the hanger is integrally joined. At the rearward portion of the plate, there is an integral spring mount plate connecting to the upper side of an air spring. An upper shock absorber mounting bracket is integral with the longitudinal plate. The hanger is especially formed to define a cavity within which a lift spring is mounted. The hanger assembly is extremely compact.

There is a transverse substantially vertical plate on the hanger to which one side of the lift spring is mounted. Another plate is movable with the lower torque rod and that plate is connected to an opposite side of the lift spring. When the lift spring is inflated, it causes the lower torque rod to swing upwardly about its connection to the hanger and lift the axle at times when the vehicle is not loaded.

BRIEF DESCRIPTION OF THE DRAWINGS

FIG. 3 is a view in section taken along the plane of the line 3—3 of FIG. 1;

FIG. 4 is a view in section taken along the plane of the line 4—4 of FIG. 1;

DETAILED DESCRIPTION OF THE PREFERRED EMBODIMENT

Figures 1, 2:
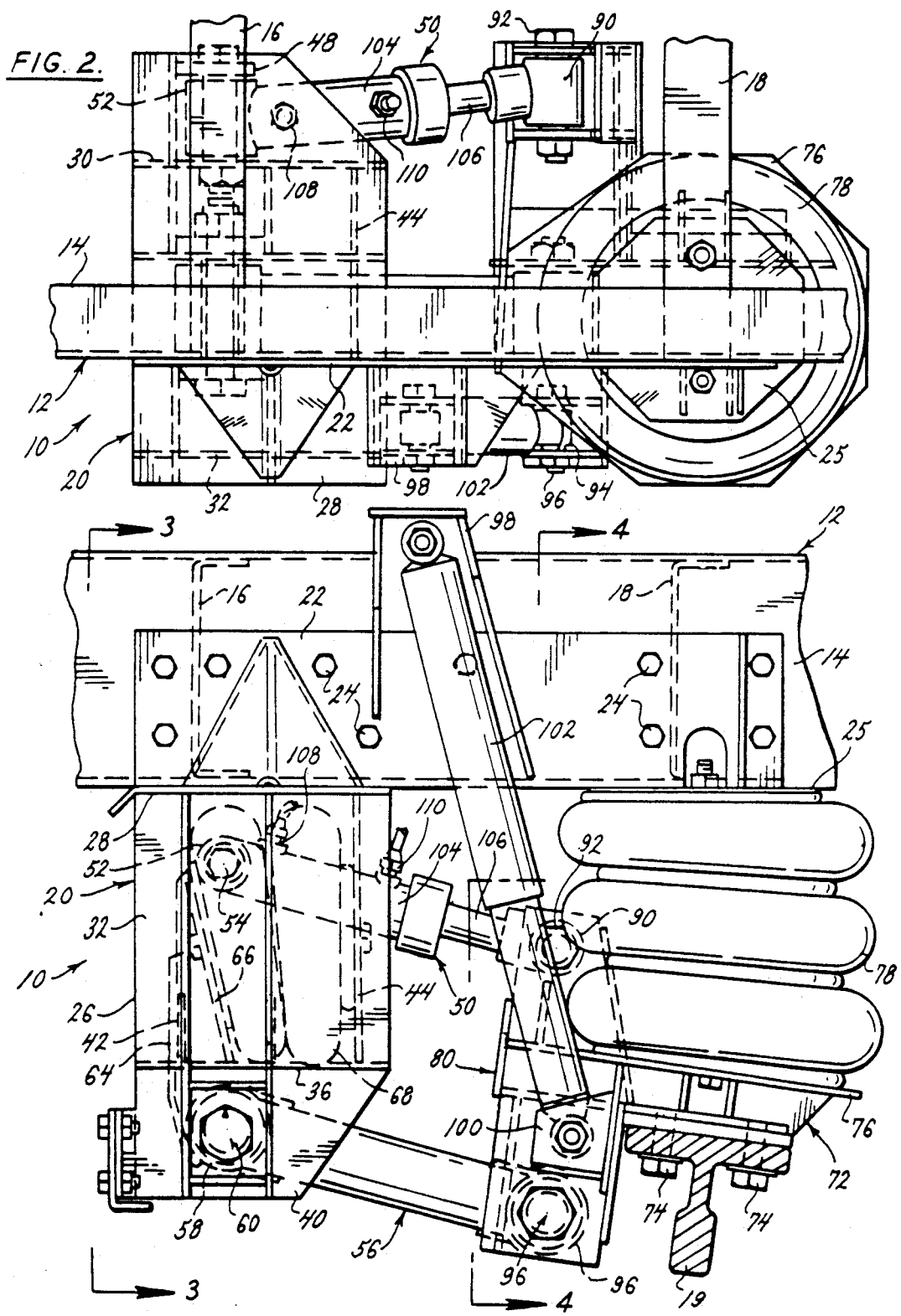
FIG. 1 is a side elevation view of the suspension system.
FIG. 2 is a top plan view of the suspension system.

This suspension system 10 is for installation on a vehicle having a chassis 12 including a longitudinal frame member 14 and transverse beams 16 and 18 that are connected between the side rail 14 and a like side rail on the opposite side of the chassis. The vehicle has at least one axle 19 that is capable of having its caster or pitch varied.

The suspension system 10 incorporates a hanger assembly 20 formed of a longitudinal plate 22 that is fastened by a plurality of bolts 24 to the side rail 14. An upper spring mounting plate 25 is welded to the longitudinal plate 22 adjacent its rearward end and a hanger 26 is welded adjacent the forward end of the longitudinal plate 22. The hanger 26 includes a horizontal plate 28 just below the longitudinal plate 22. Transversely spaced vertical plates 30 and 32 are welded to and extend downwardly from the horizontal plate 28. The vertical plates 30 and 32 lead to inwardly extending plate sections 34 and 36, respectively, and these lead to lower more closely spaced vertical sections 38 and 40, respectively.

There are reinforcing gussets 42 in the corners of the thus defined square (as viewed in FIG. 3). A transverse plate 44 is welded between the vertical plates 30 and 32, and between the horizontal plate 28 and the lower horizontal sections 34 and 36.

Spaced inboard of the vertical plate 30, there is a short vertical plate 48. An upper torque rod assembly 50 has a forward end 52 mounted on a bushing assembly 54 that is connected between the vertical plate 48 and the vertical plate 30. A lower torque rod 56 has a forward end 58 mounted on an eccentric bolt and bushing assembly 60.

An extender plate 64 is welded to the forward end 58 of the torque rod 56. A lift spring mounting plate 66 is welded to the extender plate 64. An air lift spring 68 is connected between the vertical plate 44 and the plate 66. When the air lift spring 68 is inflated, it revolves the connector plate 64 in a counterclockwise direction about the eccentric bolt and bushing assembly 60, lifting the torque rod 56.

An axle seat assembly 72 is connected by bolts 74 to the axle 19. The axle seat assembly 72 supports a lower spring mounting plate 76. An air spring 78 is connected between the upper spring mounting plate 25 and the spring mounting plate 76.

Forward of the axle 19, the axle seat 72 has welded to it a bracket assembly 80 that has spaced lower vertical plates 82 and 84 located directly below the side rail 14, and spaced upper vertical plates 86 and 88 that are inboard of the plates 82 and 84, as shown in FIG. 4. The upper torque rod assembly 50 has a rearward end 90 journalled on a bushing assembly 92 that is mounted between the plates 86 and 88. The lower torque rod 56 has a rearward end 94 that is mounted on a bushing assembly 96 connected between the plates 82 and 84.

A shock absorber mounting bracket 98 is integral with the longitudinal plate 22, a lower shock absorber mounting bracket 100 is integral with the bracket assembly 80. A shock absorber 102 is mounted between the upper bracket 98 and the lower bracket 100.

The upper torque rod assembly 50 comprises a fluid cylinder 104 and piston 106, preferably hydraulic. The piston is slidably received within the cylinder, and the extension and retraction of the piston from the cylinder varies the pitch of the vehicle axle 19 relative to a vertical plane. Each of the piston and cylinder assemblies is capable of moving the axle on its own, should the other assembly fail.

When the hydraulic piston and cylinder assembly 50 is in its extended condition, as illustrated in FIG. 1, it and the lower torque rod 56 form substantially a perfect parallelogram to maintain the pitch of the axle 19 constant as the axle moves relative to the vehicle chassis 12. In this extended condition of the hydraulic cylinder and piston assembly 50, the axle 19 is at approximately a 5° forward pitch and the vehicle will self-steer when driven in a forward direction (to the left as viewed in FIG. 1).

Figure 5:
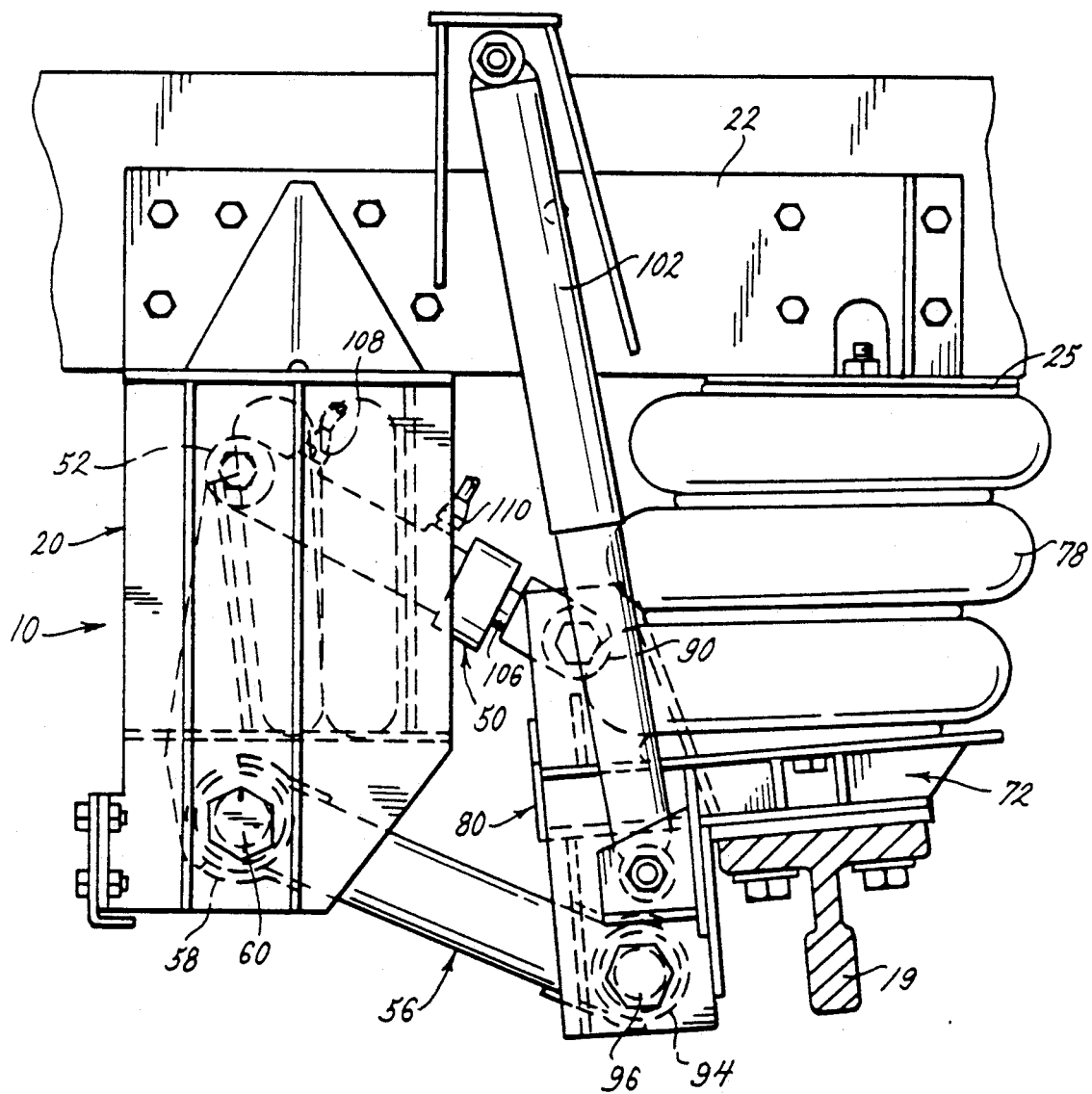
FIG. 5 is a side elevation view similar to that of FIG. 1 but showing the hydraulic piston retracted and the axle tilted to a reverse pitch.

When the hydraulic cylinder and piston assembly 50 is in its retracted condition, as illustrated in FIG. 5, the axle 19 is pivoted to a reverse pitch of approximately 5½°. In this condition, the axle will self-steer when the vehicle is driven in reverse (to the right as viewed in FIG. 5).

Figure 6:
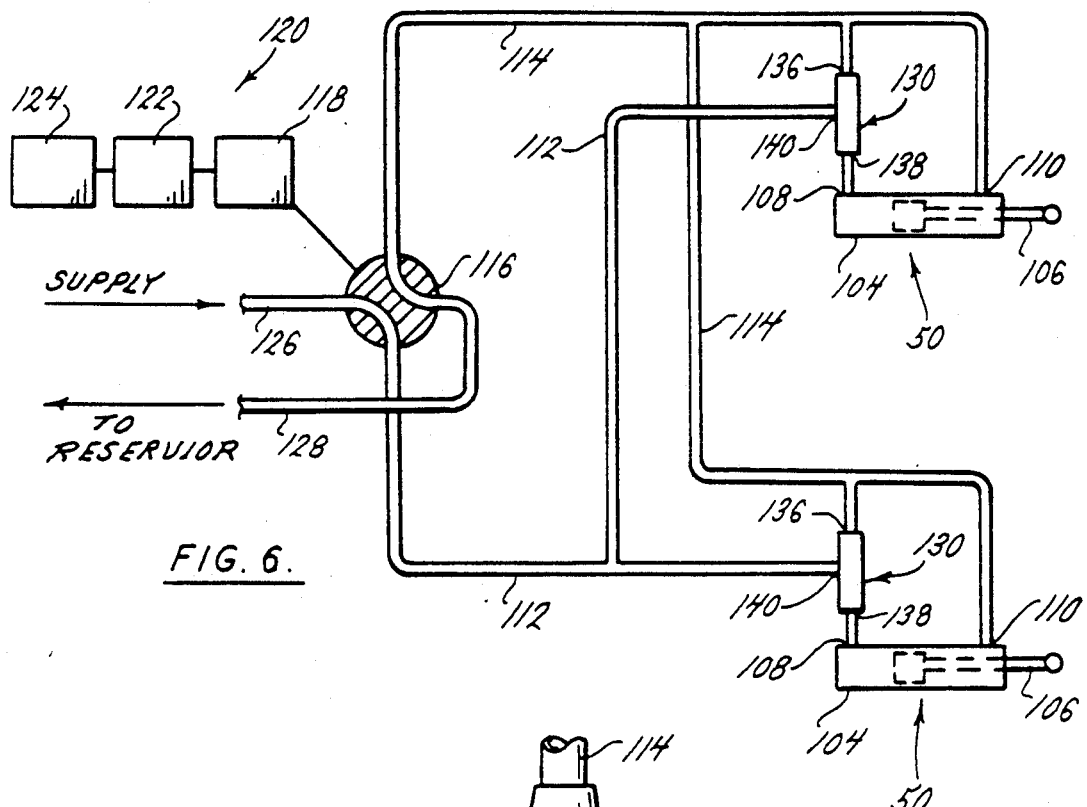
FIG. 6 is a schematic diagram of a control system for two hydraulic piston and cylinder assemblies for the suspension systems that are on opposite sides of the vehicle.

The extension and retraction of the piston from the cylinder is controlled by the fluid circuit shown in FIG. 6. Each of the cylinders 104 of the suspension system has a forward 108 and a reverse 110 hydraulic fluid port adapted to communicate with the interior of the cylinder on opposite sides of the piston. The forward hydraulic fluid port 108 communicates with a forward fluid passage 112 of the fluid circuit. The reverse fluid port 110 communicates with a reverse fluid passage 114. The forward and reverse fluid passages in turn communicate with a solenoid operated four-way valve 116. The solenoid operated valve 116 selectively distributes pressurized fluid to one of the forward and reverse fluid passages, while draining fluid from the other of the passages in response to de-energization and energization, respectively, of an electric solenoid 118. The solenoid valve is operated by an electric solenoid circuit 120 comprising a switch 122 that is opened and closed in response to operation of the vehicle transmission 124 in a forward drive ratio or a reverse drive ratio, respectively.

The control system also comprises fluid pressure/flow control valves 130 that control the communication of fluid pressure between the forward fluid passage 112 and the forward fluid ports 108 of the torque rod cylinders 104. Each fluid pressure/flow control valve comprises a valve body 132 with an axial interior bore 134 extending through the body. A reverse inlet 136 at one end of the valve body communicates the reverse fluid passage 114 with the interior bore. A piston/cylinder port 138 at the opposite end of the body communicates the interior bore with the forward fluid port 108 of a torque rod cylinder 104. A forward pressure inlet 140 communicates the forward pressure passage 112 with the middle of the interior bore of the valve body.

A ball check valve 142 is slidably received in the interior bore of the valve body between the forward pressure inlet 140 and the piston/cylinder port 138. The ball check valve comprises positioning vanes 144 that hold the ball of the check valve for axial sliding movement within the valve bore. A biasing spring 146 is seated against a snap ring 148 at one end and the positioning vanes 144 at its opposite end. The spring biases the ball check valve 142 into engagement with a reduced diameter circular seat 150 in the valve bore to prevent the passage of fluid from the piston/cylinder port 138 to the forward pressure inlet 140. Unseating the ball check valve 142 from the seat 150 permits the flow of fluid between the two ports.

A spool valve 152 comprising a piston head 154, a piston rod 156, and a piston pin 158 is also slidably received in the interior bore 134 of the valve body 132. The spool valve 152 is biased by a spring 160 to slide in the valve bore toward the reverse pressure inlet 136 of the valve. The spool valve 152 and the ball check valve 142 are shown in their at-rest positions in FIG. 7 with no fluid pressure being supplied to either the reverse pressure inlet 136 or the forward pressure inlet 140. As can be seen in this figure, in the at-rest position, the piston pin 158 of the spool valve 152 just contacts the surface of the ball check valve 142 and does not unseat the ball check valve from the valve seat 150 to allow communication between the piston/cylinder port 138 and the forward pressure inlet 140.

Figure 7:
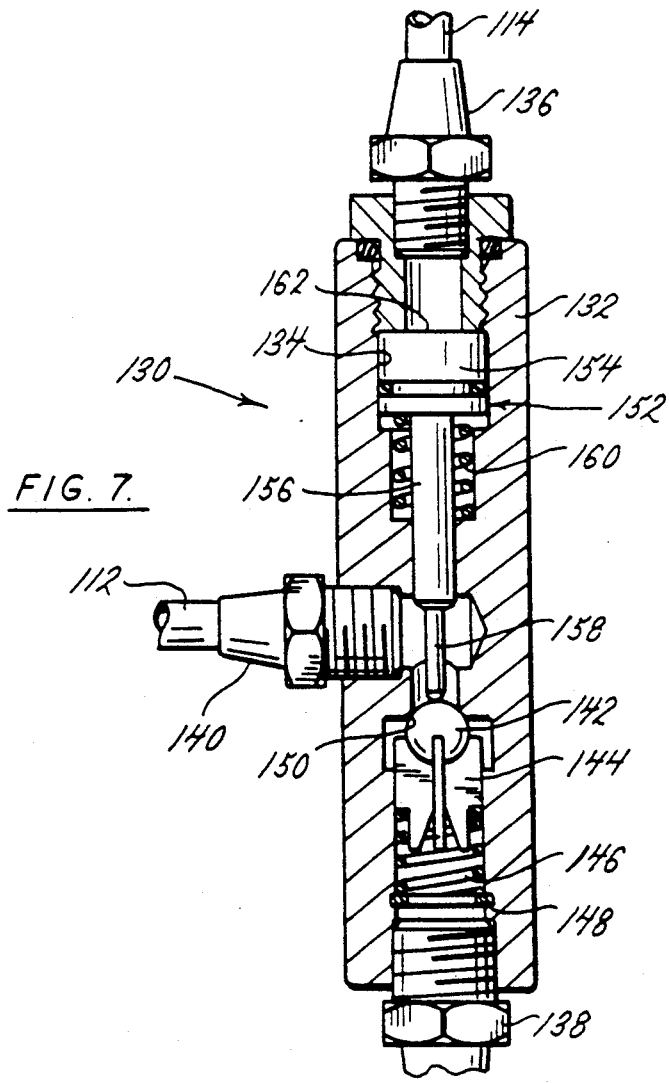
FIG. 7 is a cross section view of either control valve that controls the supply of fluid pressure to and from one of the piston and cylinder assemblies.

The control system for the upper torque rod assemblies 50 shown in FIGS. 6 and 7 operates to extend and retract the pistons 106 from the cylinders 104 to set the vehicle axle either at a positive or negative pitch, respectively, in response to vehicle transmission 124 operation. With the vehicle transmission in a forward drive ratio, the switch 122 of the electronic solenoid circuit 120 is opened, and the solenoid 118 is deenergized. With the solenoid deenergized, it is spring-biased to its at-rest position, fixing the four-way solenoid valve 116 in the position shown in FIG. 6. In this position, the four-way valve 116 supplies hydraulic fluid pressure from a pressure supply 126 to the forward fluid passage 112, and connects the reverse fluid passage 114 to drain to a hydraulic fluid reservoir 128. The hydraulic fluid pressure supplied to the forward fluid passage is delivered to the forward pressure inlet 140 of the fluid pressure control valves 130. Fluid pressure supplied to the forward pressure inlet 140 of each control valve acts upon the ball check valve 142, causing the valve to unseat from the seat 150 against the bias of the spring 146. This opens the interior valve bore 134 to the flow of pressurized fluid from the forward pressure inlet 140, around the unseated ball check valve, to the piston/cylinder port 138, and then to the forward fluid port 108 of a torque rod cylinder 104. The supply of pressurized fluid to the forward fluid ports 108 causes the pistons 106 to be extended from the cylinders 104, thereby adjusting the caster of the vehicle axle to a forward pitch. As the pistons 106 are extended in the cylinders, fluid remaining in the cylinders on the right side of the pistons as seen in FIG. 6 is forced out the reverse fluid ports 110 into the reverse fluid passage 114. This ejected fluid passes through the passage 114 to the four-way valve 116, and through this valve to the fluid reservoir 128.

With the control system of the piston/cylinder assemblies operating in the forward drive condition, should the fluid pressure in the forward fluid passage 112 suddenly drop due to a break in the fluid passage, a failure of the electric circuit 120, or for some other reason, the fluid pressure supplied to the forward pressure inlets 140 of the control valves 130 would suddenly drop. With the drop in forward fluid pressure in each control valve, the spring 146 will automatically cause the ball check valve 142 to move axially upward as seen in FIG. 7 and to seat itself in the seat 150 in the axle bore 134. This immediately seals the fluid ports 108 of the cylinders, which had been previously supplied with pressurized fluid from the forward fluid passage 112, and prevents the pressurized fluid previously supplied to the cylinders from draining out of the cylinders through the control valves and into the fluid passage 112. The automatic seating of the ball check valves 142 insures that the vehicle axle remains in its forward pitch position should the supply of fluid pressure to the forward fluid ports 108 of the cylinders 104 be interrupted by a malfunction of the control system. This avoids the loss of steering control of the vehicle should the control system malfunction while the vehicle is operating in a forward drive ratio.

When the vehicle transmissions 124 is shifted to a reverse drive ratio, the switch 122 is closed causing energization of the solenoid 118. The switch 122 controlling the energization of the solenoid 118 can be the same switch that causes the illumination of the vehicle back-up lights in response to the transmission 124 being shifted into the reverse drive ratio. On energization of the solenoid 118, the four-way solenoid valve 116 is rotated from its position shown in FIG. 6 to a position communicating the supply 126 of pressurized fluid to the reverse fluid passage 114 and communicating the forward fluid passage 112 with the hydraulic fluid reservoir 128. The hydraulic fluid pressure supplied to the reverse fluid passage 114 is delivered to the reverse fluid ports 110 of the piston/cylinder assemblies 50 and to the reverse pressure inlets 136 of the control valves 130. The fluid pressure supplied to the reverse fluid ports 110 acts on the pistons 106 to retract the pistons into the cylinders 104. This in turn forces the fluid remaining in the cylinders on the left sides of the pistons as seen in FIG. 6 to be ejected out the forward fluid ports 108 to the control valves 130. The reverse fluid pressure supplied to the reverse pressure inlet 136 of each control valve acts on the piston head 154 of the spool valve 152. This causes the spool valve to be axially displaced against the bias of the spring 160, causing the piston pin 158 of the spool valve to engage the ball check valve 142 and unseat the ball check valve from the seat 150 against the bias of spring 146. This permits the fluid ejected from the forward fluid ports 108 of the cylinders to pass through the piston/cylinder ports 138, the interior bores, and out the forward pressure inlets 140 of the control valves 130. The ejected fluid then passes through the forward fluid passage 112, the four-way solenoid valve 116, and is drained to the pressure reservoir 128.

In each control valve 130, the effective surface area of the face 162 of the spool valve piston head 154 acted on by the fluid pressure supplied to the reverse pressure inlet is about four times larger than the effective area of the ball check valve 142 acted on by the fluid pressure exhausted from the cylinder 104 to the piston/cylinder port 138 of the valve when the piston 106 is retracted into the cylinder 104 for reverse driving. This insures that the spool valve 152 will be effective in unseating the ball check valve 142 to permit the cylinder to drain through the control valve 130 even with a significant buildup of fluid pressure behind the check valve 142.

With the operation of the control system of FIGS. 6 and 7 discussed above, when the vehicle transmission 124 is in any forward drive ratio, the switch 122 will be open and the four-way solenoid valve 116 and the control valves 130 will control flow of fluid to the ports 108, and away from the ports 110, such that the hydraulic cylinder and piston assemblies 50 will be in the extended condition illustrated in FIG. 1. This sets the pitch of the axle 19 for self-steering when the vehicle is driven in a forward direction. When the vehicle transmission 124 is shifted to put the vehicle in reverse, the switch 122 is closed, reversing the flow of hydraulic fluid to the ports 108, and away from the ports 110. This retracts the hydraulic cylinder and piston assemblies 50. As a result, the axle seat assembly 72 pivots about the bushing mount 96 from the condition illustrated in FIG. 1 to the condition illustrated in FIG. 5, pivoting the axle 19 from the forward pitch illustrated in FIG. 1 to the reverse pitch illustrated in FIG. 5. In this reverse pitch, the axle will self-steer when the vehicle is operated in a reverse direction.

When the vehicle is not loaded, the lift spring 68 is pressurized to pivot the lower torque rod 56 in a counterclockwise direction. This will cause the axle seat assembly 72 and the axle 19 to be raised.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a vehicle having a transmission with forward and reverse drive ratios, a chassis, and at least one axle with a variable pitch, a means to vary the axle pitch between a positive pitch and a negative pitch comprising:

axially extendable and retractable piston/cylinder means supported between the vehicle chassis and the axle and arranged to vary the pitch of the axle in response to extension and retraction of the piston/cylinder means;

control means in operative communication with the vehicle transmission and the piston/cylinder means, the control means being adapted to control the piston/cylinder means to vary the pitch of the axle to a positive pitch relative to a vertical plane when the transmission is in a forward drive ratio, to vary the pitch of the axle to a negative pitch relative to the vertical plane when the transmission is in a reverse drive ratio, and to maintain the axle in a positive pitch when operative communication with the vehicle transmission is interrupted.

2. The axle pitch varying means of claim 1 comprising:

the piston/cylinder means including a pair of piston/cylinder assemblies, each assembly being capable of varying the pitch of the axle individually should the other assembly fail.

3. The axle pitch varying means of claim 1 comprising:

the control means being adapted to control extension of the piston/cylinder assemblies when the transmission is in a forward drive ratio, and to control retraction of the piston/cylinder assemblies when the transmission is in a reverse drive ratio.

4. The axle pitch varying means of claim 1 comprising:

the control means includes a pair of fluid control valves.

5. The axle pitch varying means of claim 2 comprising:

the control means includes a pair of fluid control valves, each control valve being in fluid communication with one of the pair of piston/cylinder assemblies.

6. The axle pitch varying means of claim 5 comprising:

the pair of fluid control valves being adapted to receive a forward fluid pressure signal when the transmission is in a forward drive ratio, and to supply fluid pressure to the pair of piston/cylinder assemblies in response to said signal; and the pair of fluid control valves being adapted to receive a reverse fluid pressure signal when the transmission is in the reverse drive ratio, and to drain fluid pressure from the pair of piston/cylinder assemblies in response to said reverse signal.

7. The axle pitch varying means of claim 6 comprising:

a fluid distribution means in fluid communication with a source of pressurized fluid, a fluid reservoir, and the pair of fluid control valves, the distribution means being adapted to supply the forward fluid pressure signal to the pair of control valves when the transmission is in the forward drive ratio and to supply the reverse fluid pressure signal to the pair of control valves when the transmission is in the reverse drive ratio.

8. The axle pitch varying means of claim 7 comprising:

the fluid distribution means including a solenoid operated four-way valve, a forward fluid passage communicating the four-way valve with the pair of control valves, and a reverse fluid passage communicating the four-way valve with the pair of control valves, the four-way valve being adapted to communicate the forward fluid passage with the source of pressurized fluid and the reverse fluid passage with the fluid reservoir when the solenoid is de-energized, and the four-way valve being adapted to communicate the reverse fluid passage with the source of pressurized fluid and the forward fluid passage with the fluid reservoir when the solenoid is energized.

9. The axle pitch varying means of claim 8 comprising:

each control valve of the pair having a forward pressure port connected to the forward fluid passage, a reverse pressure port connected to the reverse fluid passage, and a piston/cylinder port communicating with a piston/cylinder assembly.

10. The axle pitch varying means of claim 6 comprising:

the pair of fluid control valves being adapted to respond to an interruption of the forward fluid pressure signal to prevent fluid pressure supplied to the pair of piston/cylinder assemblies in response to said signal from draining from said assemblies.

11. The axle pitch varying means of claim 1 comprising:

the control means including a fluid control valve adapted to receive a forward fluid pressure signal when the transmission is in a forward drive ratio and to supply pressurized fluid to the piston/cylinder means in response to said forward signal, the control valve being adapted to receive a reverse fluid pressure signal when the transmission is in a reverse drive ratio and to drain pressurized fluid from the piston/cylinder means in response to said reverse signal; and the control valve being adapted to prevent fluid pressure from draining from said piston/cylinder means when said forward signal is interrupted.

12. The axle pitch varying means of claim 11 comprising:

the fluid control valve having a valve body with an axial bore extending therethrough, a forward signal port adapted to receive the forward pressure signal, a reverse signal port adapted to receive the reverse pressure signal, and a piston/cylinder port in fluid communication with the piston/cylinder means.

13. The axle pitch varying means of claim 12 comprising:

the fluid control valve having a check valve means arranged in the valve bore between the forward signal port and the piston/cylinder port, the check valve means being adapted to open to permit fluid communication from the forward signal port to the piston/cylinder port, and to close to prevent fluid communication from the piston/cylinder port to the forward signal port.

14. The axle pitch varying means of claim 13 comprising:

the fluid control valve having a spool valve means arranged in the valve bore, the spool valve means being adapted to open the check valve means when the control valve receives a reverse fluid pressure signal.

15. The axle pitch varying means of claim 11 comprising:

the control means including a solenoid operated valve adapted to supply the forward fluid pressure signal to the fluid control valve when the transmission is in the forward drive ratio, and adapted to supply the reverse fluid pressure signal to the control valve when the transmission is in the reverse drive ratio.

16. The axle pitch varying means of claim 15 comprising:

the solenoid operated valve having an electric solenoid, the valve being adapted to supply the forward fluid pressure signal when the solenoid is de-energized, and being adapted to supply the reverse fluid pressure signal when the solenoid is energized.

17. The axle pitch varying means of claim 16 comprising:

the de-energization and energization of the solenoid being in response to the opening and closing of an electric switch, respectively; and the opening and closing of the electric switch being in response to operation of the vehicle transmission in the forward and reverse drive ratios, respectively.

18. The axle pitch varying means of claim 17 comprising:

the electric switch being a vehicle back-up light switch.

19. A self-steering suspension system for a vehicle having a transmission with forward and reverse drive ratios, a chassis, and at least one variable pitch axle, the suspension system comprising:

a hanger means supported by the vehicle chassis;

an axle seat means supporting the vehicle axle;

an upper torque rod having first and second ends, with the first end pivotally connected to the hanger means and the second end pivotally connected to the axle seat means;

a lower torque rod having first and second ends, with the first end pivotally connected to the hanger means and the second end pivotally connected to the axle seat; and control means in operative communication with the vehicle transmission and adapted to selectively vary the length of one of the torque rods to change the pitch of the axle supported by the axle seat means to a positive pitch relative to a vertical plane when the transmission is in a forward drive ratio, to change the pitch of the axle to a negative pitch relative to a vertical plane when the transmission is in a reverse drive ratio, and to maintain the positive pitch of the axle when the operative communication with the vehicle transmission is interrupted.

* * * * *